US010571352B2

(12) United States Patent
Huang

(10) Patent No.: US 10,571,352 B2
(45) Date of Patent: Feb. 25, 2020

(54) RELIEVABLE SAFETY PRESS GAUGE

(71) Applicant: Zhejiang Fumao Machinery Co., Ltd., Jiaxing (CN)

(72) Inventor: Changqing Huang, Jiaxing (CN)

(73) Assignee: Zhejiang Fumao Machinery Co., Ltd., Jiaxing (CN)

( * ) Notice: Subject to any disclaimer, the term of this patent is extended or adjusted under 35 U.S.C. 154(b) by 75 days.

(21) Appl. No.: 15/793,273

(22) Filed: Oct. 25, 2017

(65) Prior Publication Data

US 2018/0372572 A1 Dec. 27, 2018

(30) Foreign Application Priority Data

Jun. 27, 2017 (CN) .................... 2017 2 0755957 U

(51) Int. Cl.
G01L 19/06 (2006.01)
F17C 1/14 (2006.01)

(52) U.S. Cl.
CPC ...... *G01L 19/0618* (2013.01); *G01L 19/0672* (2013.01); *F17C 1/14* (2013.01)

(58) Field of Classification Search
CPC ..... G01L 19/0618; G01L 19/0672; F17C 1/14
USPC .......................................... 73/738
See application file for complete search history.

(56) References Cited

U.S. PATENT DOCUMENTS 5,894,093 A * 4/1999 Ferguson ............ G01L 19/0672
73/706
2006/0075821 A1* 4/2006 Otsuka ................ G01L 19/0084
73/715

FOREIGN PATENT DOCUMENTS

TW M368063 * 11/2009

* cited by examiner

*Primary Examiner* — Tarun Sinha
(74) *Attorney, Agent, or Firm* — Shumaker, Loop & Kendrick, LLP

(57) ABSTRACT

The present disclosure discloses a relievable safety press gauge. The relievable safety press gauge comprises a fixed mount comprising a rotation body and a crimped edge provided at an edge of lower end of the body, a base provided at a bottom of the fixed mount, and an edge of upper end of the base wrapped and fixed by the crimped edge, and a membrane, an edge of which is located between an edge of lower end of the body and the edge of upper end of the base; further comprising an O-ring made of rubber or silicone provided between an edge of the membrane and the edge of upper end of the base, and the crimped edge is provided with a hollow-out pressure release gap, a first release clearance is provided between the edge of upper end of the base and the edge of the membrane, while a second release clearance is provided between the edge of upper end of the base and the crimped edge. The present disclosure can automatically depressurize when the applied pressure is excessive, to increase the safety of the press gauge.

3 Claims, 2 Drawing Sheets

US 10,571,352 B2

RELIEVABLE SAFETY PRESS GAUGE

TECHNICAL FIELD

The present disclosure pertains to the field of press gauge product, and specifically to a relievable safety press gauge.

BACKGROUND

Press gauge is mainly used for pressure monitoring in closed environments. The test range of a press gauge used for barometric pressure measurement is usually from 0 to 30 $Kg/cm^2$, while the upper limit of test range of a press gauge for oil pressure measurement can reach or even exceed 3000 $Kg/cm^2$, such that the upper limit of the test ranges of the latter could be up to 100 times that of the former. When user is not clear about the application range of the press gauge itself, it may cause press gauge to rupture or even lead to an explosion due to excessive applied pressure. The press gauge in the prior art, such as the Chinese Taiwan Patent Application No. 098208087, discloses a press gauge structure which is difficult to guarantee the safety of the press gauge due to a lack of a pressure relief protection structure. In addition, the base of press gauge structure in the patent above is made of zinc-aluminum alloy, thus the production and processing efficiency is low, while the cost is high; and a membrane in the press gauge structure is fixed through screw at its centre, which increases the thickness of the press gauge. The shortcomings above need to be further improved.

SUMMARY

To overcome shortcomings in the prior art, the present disclosure provides a relievable safety press gauge, which can automatically depressurize when the applied pressure is excessive, to increase the safety of the press gauge.

The technical scheme of the disclosure for solving the problem is as follow:

A relievable safety press gauge, comprising:

a fixed mount comprising a rotation body and a crimped edge provided at an edge of lower end of the body;

a base provided at a bottom of the fixed mount, and an edge of upper end of the base wrapped and fixed by the crimped edge; and a membrane, an edge of which is located between an edge of lower end of the body and the edge of upper end of the base;

wherein it further comprises an O-ring made of rubber or silicone provided between an edge of the membrane and the edge of upper end of the base, and the crimped edge is provided with a hollow-out pressure release gap, a first release clearance is provided between the edge of upper end of the base and the edge of the membrane, while a second release clearance is provided between the edge of upper end of the base and the crimped edge.

As a further improvement of the above mentioned technical scheme, the base is formed by stamping, and the base comprises an annular portion for fitting with the fixed mount and a cylindrical portion for fixedly mounting, a bottom of the cylindrical portion is provided with a ventilated through hole, and an outward of the cylindrical portion is provided with a mounting thread or a mounting slot.

As a further improvement of the above mentioned technical scheme, the inward of the fixed mount is provided with a rotary member, which is provided at an axis of the fixed mount, and a lower end of the rotary member is connected to a centre of the membrane by rivet.

Compared to the prior art, the disclosure has the beneficial effects as below:

The disclosure provides a relievable safety press gauge, when the applied pressure exceeds the application range of the press gauge, the pressure of the internal O-shaped environment breaks through the sealing of the O-ring, escapes from the first release clearance and the second release clearance, and leaks from the pressure release gap to the external environment, in order to achieve the protection of the press gauge, i.e. an explosion-proof function, to increase the safety of the use of press gauges. In addition, the base structure is optimized so that it can be stamping forming, which will help reducing production and processing costs of the press gauge, and improve production and processing efficiency. In addition, by using the rivet to connect the rotary member to the membrane instead of the thread connection in the prior art, it can reduce the thickness of the press gauge.

BRIEF DESCRIPTION OF THE DRAWING

The present disclosure will further be described below with reference to drawings and embodiments.

DETAILED DESCRIPTION OF THE EMBODIMENTS

Figure 1:
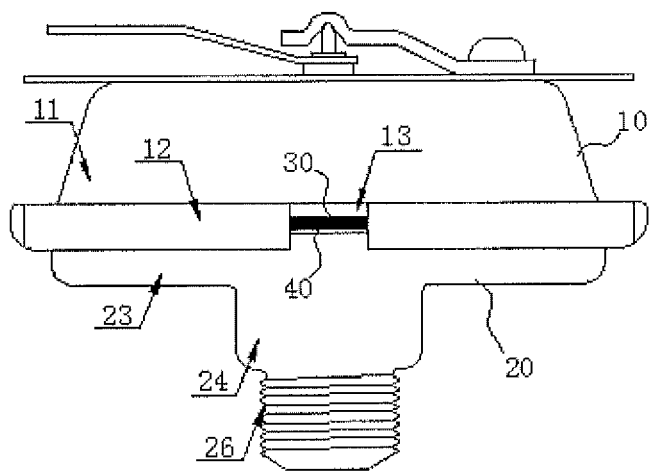
FIG. 1 is a schematic appearance structural diagram of a relievable safety press gauge in the present disclosure.
Figure 2:
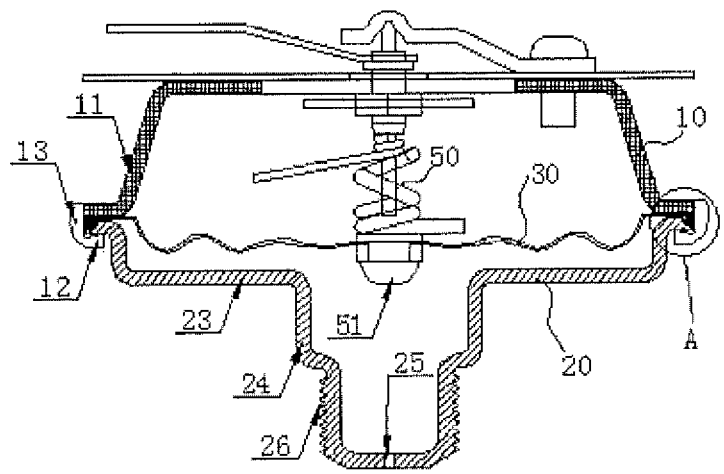
FIG. 2 is a cross-sectional schematic structural diagram of the relievable safety press gauge in the present disclosure.
Figure 3:
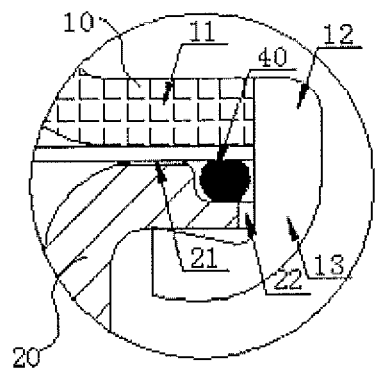
FIG. 3 is an enlarged schematic structural diagram of a region A in FIG. 2.
Figure 4:
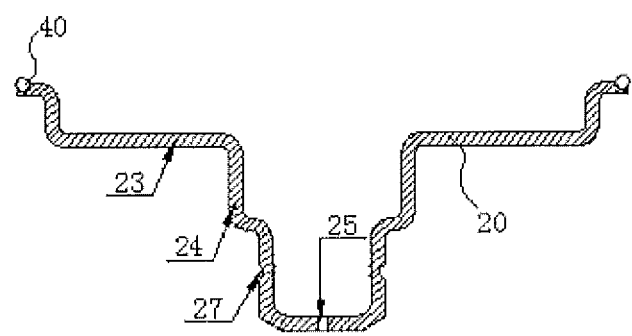
FIG. 4 is another schematic structural diagram of a base in the present disclosure.

Referred to FIGS. 1-4, FIG. 1-4 are schematic structural diagrams of a specific embodiment of the present disclosure.

As shown in Figures, a relievable safety press gauge comprising: a fixed mount 10 comprising a rotation body 11 and a crimped edge 12 provided at an edge of lower end of the body 11, a base 20 provided at a bottom of the fixed mount 10, and an edge of upper end of the base 20 wrapped and fixed by the crimped edge 12, and a membrane 30, an edge of which is located between an edge of lower end of the body 11 and the edge of upper end of the base 20; further comprising an O-ring 40 made of rubber or silicone provided between an edge of the membrane 30 and the edge of upper end of the base 20, and the crimped edge 12 is provided with a hollow-out pressure release gap 13, a first release clearance 21 is provided between the edge of upper end of the base 20 and the edge of the membrane 30, while a second release clearance 22 is provided between the edge of upper end of the base 20 and the crimped edge 12. When the applied pressure exceeds the application range of the press gauge, the pressure of the internal O-shaped environment breaks through the sealing of the O-ring 40, escapes from the first release clearance 21 and the second release clearance 22, and leaks from the pressure release gap 13 to the external environment, in order to achieve the protection of the press gauge, i.e. an explosion-proof function.

As a further improvement, the base 20 is formed by stamping, and the base 20 comprises an annular portion 23 for fitting with the fixed mount 10 and a cylindrical portion 24 for fixedly mounting, a bottom of the cylindrical portion 24 is provided with a ventilated through hole 25, and the outward of the cylindrical portion 24 is provided with a mounting thread 26, or a mounting slot 27 as shown in FIG.

4. The above structure makes the base 20 capable of stamping forming, which will help reducing production and processing costs of the press gauge, and improve production and processing efficiency.

As a further improvement, the inward of the fixed mount 10 is provided with a rotary member 50, which is provided at the axis of the fixed mount 10, and a lower end of the rotary member 50 is connected to a centre of the membrane 30 by rivets 51. By using the rivet 51 to connect the rotary members 50 to the membrane 30 instead of the thread connection in the prior art, it can reduce the thickness of the press gauge.

The above descriptions are merely preferred embodiments of the present disclosure, of course, the disclosure may be implemented in a different form from the above-described embodiment. It will be understood by those skilled in the art that equivalents or corresponding modification without departing from the spirit of the disclosure may be made within the scope of the present disclosure.

What is claimed is:

1. A relievable safety pressure gauge, comprising: a fixed mount comprising a rotation body and a crimped edge provided at an edge of a lower end of the body; a base provided at a bottom of the fixed mount, and an edge of an upper end of the base wrapped and fixed by the crimped edge, and a membrane, an edge of which is located between an edge of the lower end of the body and the edge of upper end of the base; further comprising an 0-ring made of rubber or silicone provided between an edge of the membrane and the edge of upper end of the base, and the crimped edge provided with a hollow-out pressure release gap, a first release clearance provided between the edge of upper end of the base and the edge of the membrane, and a second release clearance provided between the edge of upper end of the base and the crimped edge.

2. The relievable safety pressure gauge according to claim 1, wherein the base is formed by stamping, and the base comprises an annular portion for fitting with the fixed mount and a cylindrical portion for fixedly mounting, a bottom of the cylindrical portion is provided with a ventilated through hole, and an outward of the cylindrical portion is provided with a mounting thread or a mounting slot.

3. The relievable safety pressure gauge according to claim 1, wherein an interior of the fixed mount is provided with a rotary member, which is provided at an axis of the fixed mount, and a lower end of the rotary member is connected to a centre of the membrane by a rivet.

* * * * *